US011897008B2

(12) United States Patent
Everett et al.

(10) Patent No.: US 11,897,008 B2
(45) Date of Patent: Feb. 13, 2024

(54) COMPOSITION, SYSTEM, AND METHOD FOR AUTOMATIC DOSING OF A URINAL CLEANER

(71) Applicant: NCH Corporation, Irving, TX (US)

(72) Inventors: Gabriel F. K. Everett, Mansfield, TX (US); Mike Rushing, Denton, TX (US); Charles J. Greenwald, Irving, TX (US)

( * ) Notice: Subject to any disclaimer, the term of this patent is extended or adjusted under 35 U.S.C. 154(b) by 235 days.

(21) Appl. No.: 17/202,779

(22) Filed: Mar. 16, 2021

(65) Prior Publication Data

US 2021/0291235 A1 Sep. 23, 2021

Related U.S. Application Data

(60) Provisional application No. 62/991,771, filed on Mar. 19, 2020.

(51) Int. Cl.
*B08B 3/00* (2006.01)
*B08B 3/08* (2006.01)
(Continued)

(52) U.S. Cl.
CPC ................ *B08B 3/08* (2013.01); *B08B 9/032* (2013.01); *C11D 1/94* (2013.01); *C11D 3/222* (2013.01);
(Continued)

(58) Field of Classification Search
CPC .... C11D 1/00; C11D 1/72; C11D 1/90; C11D 3/22; C11D 3/222; C11D 3/32;
(Continued)

(56) References Cited

U.S. PATENT DOCUMENTS 5,584,079 A 12/1996 Wong et al.
5,672,279 A 9/1997 Sargent et al.
(Continued)

FOREIGN PATENT DOCUMENTS

WO WO 2006/013319 * 2/2006 ............... C11D 3/32

OTHER PUBLICATIONS

Vectair Systems, Inc., Vectair Quadrasan Sanitizer (All Fragrances), Material Safety Data Sheet., http://janrep.com/wp-content/images/Vectair/QUADRASAN_MSDS_SANITIZER.pdf, Date of last change, Dec. 8, 2018, retrieved on Mar. 4, 2021.
(Continued)

*Primary Examiner* — Brian P Mruk
(74) *Attorney, Agent, or Firm* — Scheef & Stone, LLP; Robin L. Barnes

(57) ABSTRACT

A urinal and pipe cleaning composition and automated dispensing system and method. The composition preferably comprises urea hydrochloride, a thickener, optionally one or more surfactants, and optionally fragrance. Preferably, the surfactants comprise cocamidopropyl betaine and one or more ethoxylated alcohols. The composition preferably has a viscosity allowing it to be dispensed from an automated dispenser and to coat the surfaces to be cleaned to allow sufficient contact time to dissolve accumulated salts and remove stains. A predetermined dose of the composition is dispensed at predetermined time intervals. Different dose amounts and time intervals may be used depending on the level of usage of the urinal, the amount of salt scale, and level of staining.

47 Claims, 1 Drawing Sheet

(51) Int. Cl.

| | |
|---|---|
| ***B08B 9/032*** | (2006.01) |
| ***C11D 1/00*** | (2006.01) |
| ***C11D 1/72*** | (2006.01) |
| ***C11D 1/90*** | (2006.01) |
| ***C11D 3/22*** | (2006.01) |
| ***C11D 3/32*** | (2006.01) |
| ***C11D 3/37*** | (2006.01) |
| ***C11D 11/00*** | (2006.01) |
| ***C11D 1/94*** | (2006.01) |
| ***E03D 9/00*** | (2006.01) |

(52) U.S. Cl.
CPC .......... *C11D 3/323* (2013.01); *C11D 11/0023* (2013.01); *E03D 9/002* (2013.01); *E03D 9/005* (2013.01); *B08B 2209/032* (2013.01); *C11D 1/72* (2013.01); *C11D 1/90* (2013.01)

(58) Field of Classification Search
CPC .. C11D 3/323; C11D 3/37; B08B 3/00; B08B 3/08; B08B 9/032; E03D 9/002; E03D 9/005
See application file for complete search history.

(56) References Cited

U.S. PATENT DOCUMENTS

| | | | |
|---|---|---|---|
| 6,340,660 | B1 | 1/2002 | Gastgaber |
| 7,501,026 | B2 | 3/2009 | Riou |
| 8,293,699 | B2 | 10/2012 | Futterer et al. |
| 8,784,573 | B1 | 7/2014 | Macdonald, III |
| 9,139,800 | B2 | 9/2015 | Monsrud et al. |
| 9,636,431 | B2 | 5/2017 | Teeling et al. |
| 10,392,554 | B2 | 8/2019 | Macdonald, II |
| 2004/0128750 | A1 * | 7/2004 | Cramer ..................... E03D 9/03 4/227.1 |
| 2014/0178444 | A1 | 6/2014 | Stadler et al. |
| 2015/0190538 | A1 | 7/2015 | Olvera et al. |
| 2020/0122181 | A1 | 4/2020 | Dix et al. |

OTHER PUBLICATIONS

Regulatory Affairs Department, elements Organic Acid Bowl Cleaner, Safety Data Sheet, Dec. 19, 2014, Revised Aug. 5, 2020, MISCO Products Corporation, Reading, PA.

* cited by examiner

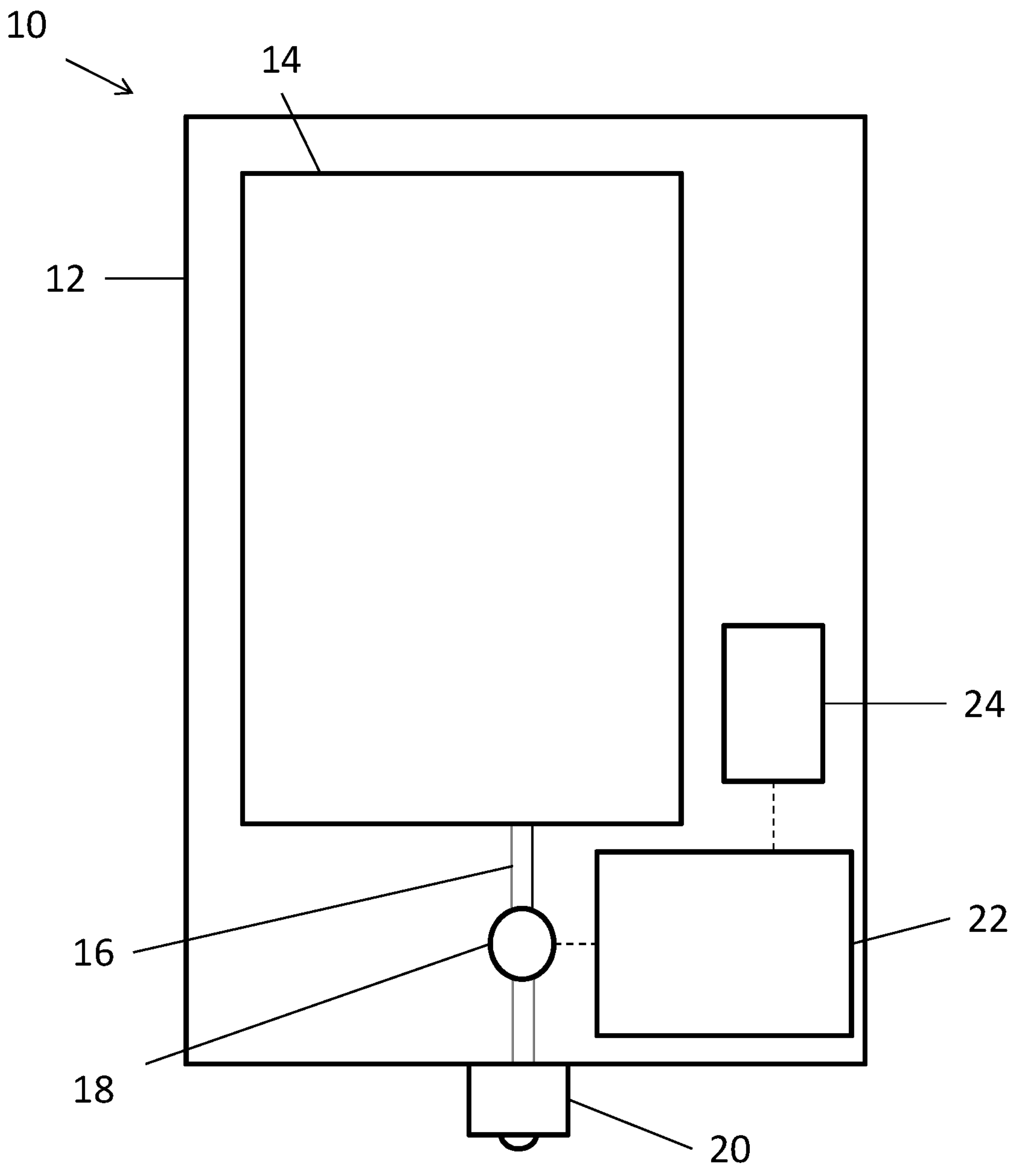
10
14
12
24
22
16
18
20

COMPOSITION, SYSTEM, AND METHOD FOR AUTOMATIC DOSING OF A URINAL CLEANER

CROSS REFERENCE TO RELATED APPLICATION

This application claims the benefit of U.S. Provisional Application No. 62/991,771 filed on Mar. 19, 2020.

BACKGROUND OF THE INVENTION

1. Field of the Invention

The present invention relates to a composition, system, and method for using a thickened urea hydrochloride and hard surface cleaning formulation for urinal cleaning and maintenance in a metered dosing system.

2. Description of Related Art

Backups and associated odors in urinals are a major problem for facilities like corporate offices, hospitals, stadiums, airports, and schools. These issues are caused by a build-up of scale in pipes caused by dissolved mineral salts in the water and uratic (uric) salts from urine. Dissolved salts in the water cause scale build-up on the porcelain surfaces of the urinal causing staining. Uric salts build up to form crusty deposits that clog pipes. Often times, pipes from individual urinals will combine at one pipe that leads to the main line out of the building. A clog due to uric salt buildup in a downstream pipe may cause a backup in all associated urinals and floor drains resulting in costly repairs and downtime.

Clogs in urinal pipes are often treated either mechanically or chemically. Mechanical clog removal requires that the urinal be removed from the wall (which is expensive) or the use of an extendable auger (which may not be effective). The use of high-pressure water (hydro-jetting) may also be used to remove clogs. Mechanical clog removal with an auger or high-pressure water can be damaging to pipes over time and may lead to pipe collapse.

Chemical clog removal uses harsh chemicals such as hydrochloric, phosphoric, or formic acid. Not only are these chemicals corrosive to skin and surfaces, but they produce vapors that are toxic. Since most urinal products are dosed manually and in large volumes, building maintenance takes on risk during each treatment. There is a need for a safe, effective chemical treatment that can be automatically dosed into a urinal for maintenance and clog prevention.

Urea hydrochloride (CAS #506-89-8) is a stable salt formed between molar equivalents of urea (CAS #57-13-6) and hydrochloric acid (CAS #7647-01-0). It is known that urea hydrochloride dissolves uric acid salt crystals and water-insoluble metal salts. Urea hydrochloride is less corrosive on metal and other surfaces than other acids (e.g. hydrochloric, phosphoric, or formic acid) typically used for cleaning and may be used as an acid replacement in urinal cleaning programs. Fragrances may also be included to counteract odor. Currently, formulations including urea hydrochloride, some with added fragrance, are available for use in the industry, such as Acid Bathroom & Shower Cleaner by Spartan Chemical, Elements Organic Acid Bowl Cleaner by Parish, Diversey™ Crew Concentrated Shower/Tub/Tile Cleaner, and URINAL ENFORCER by Best Plumbing. These products are typically poured in or sprayed on a urinal periodically or when there is a need to address a particular issue, such as odors, back-ups/clogs, or staining. Current products may also be concentrated and intended for use as a dilution, such as Acid Bathroom & Shower Cleaner by Spartan Chemical and Diversey™ Crew Concentrated Shower/Tub/Tile Cleaner. These products are manually diluted at the point-of-use prior to pouring in or spraying on the urinal, which increases the risk of spillage or human contact with the concentrated cleaner.

Automated dispenser systems, including that disclosed in U.S. Pat. No. 5,584,079, are well known in the art. These dispensers allow for a metered amount of a cleaning or other treatment product to be dispensed from a container of the product at predetermined times or upon manual activation. The treatment product is typically dispensed by spraying or streaming onto the surface to be treated. For example, the Activa Sanitizing System by Kennedy Hygiene, the Quadrasan automatic drip deodorizer by Parish, and the Drip-O-Matic Gravity Drip Restroom Fixture Deodorizer by Air-Scent International™ are commercially available automated dispensers. However, none of the known commercial urinal cleaning products allow for use of a concentrated formula in an automated dispenser to automatically dose the treatment product into a urinal or pipe as part of a preventative maintenance program or as needed for treatment of a particular issue in a urinal system, to allow for treatment and reduce human exposure to the chemicals. The currently available products are too thin and/or are not concentrated. There is a need for such a concentrated formula that can be used with an automated dispenser.

SUMMARY OF THE INVENTION

According to one preferred embodiment of the invention, an improved urinal and pipe cleaning composition comprises urea hydrochloride (or a combination of urea and hydrochloric acid) and a thickener, such as xanthan gum, carrageenan, pectin, or carboxymethyl cellulose. The thickener allows the composition to have sufficient viscosity to be used with an automated dispenser and allows the composition to coat the urinal and pipe surfaces to be cleaned to allow greater contact time with the surface for treatment. Most preferably, the composition has a viscosity of 200 to 600 centipoise, more preferably 300-500 centipoise, and most preferably 350-450 centipoise. According to another preferred embodiment, the composition further comprises one or more hard surface cleaners, such as non-ionic or amphoteric surfactants. Preferred hard surface cleaners include cocamidopropyl betaine (CAPB) and/or ethoxylated alcohol surfactants. Most preferably, the compositions according to embodiments of the invention are in a concentrated formula that is dispensed to the point-of-use.

According to another preferred embodiment, an automated dispenser system is configured to dispense a predetermined dosage of a urinal and pipe cleaning composition, preferably a composition according to preferred embodiments of the invention, at predetermined time intervals by spraying or streaming the composition dose into a urinal or a pipe system. A stream spray is most preferred with the concentrated composition being diluted into a flush volume of water in the urinal (typically 0.5-5 gallons). An automated dispensing system preferably comprises a container for holding an initial volume of the composition, a controller or timer, a valve, and a dispensing tube. An automated dispensing system also preferably comprises a user interface that allows a user to dispense a dose of a urinal and pipe cleaning composition on-demand, if an additional dose between the timed doses is needed.

According to another preferred embodiment of the invention, a method for cleaning a urinal or urinal pipe system and a method for automatically dispensing a metered dose of urinal and pipe cleaning composition comprises periodically dispensing a dose of a cleaning composition at predetermined time intervals onto a urinal surface, into a drain, or into a piping system connected to one or more urinals. Most preferably, a urinal and pipe cleaning composition according to preferred embodiments of the invention, preferably in concentrated form, is used with the methods of the invention. Most preferably, preferred methods of the invention use an automated dispenser system according to preferred embodiments of the invention, but any known automated dispenser that is useable with compositions according to preferred embodiments of the invention may also be used. A method of automatically dispensing preferably further comprises diluting the cleaning composition by flushing the urinal. Preferably, a concentrated urinal and pipe cleaning composition is allowed to contact the surfaces to be cleaned, including running down the surfaces by gravity, for a period of contact time prior to being diluted with water by flushing the urinal. Dilution by flushing reduces the need for human handling by hand-mixing a dilution. Once diluted, the cleaning composition runs down the remaining surfaces of the urinal, drain, and piping to provide additional cleaning and freshening.

The preferred embodiments of the present invention are useful in maintaining urinals and urinal piping systems and drains to prevent build-up, stains, and associated odor. The preferred embodiments may be used with both waterless urinals and flush urinals. The preferred embodiments are particularly useful in the automated, periodic metered dosing of a small quantity of a concentrated, thickened urinal cleaning product comprising urea hydrochloride, a thickener, optionally one or more surfactants, and optionally one or more fragrances. This metered dosing allows for cleaning and maintenance of a urinal without the need for handling large volumes of harsh, corrosive, toxic chemicals and without the need for diluted concentrated cleaners by hand mixing.

BRIEF DESCRIPTION OF THE DRAWINGS

The invention is further described and explained in relation to the following drawing wherein:

FIG. 1 is a front elevation of a dispensing system according to a preferred embodiment of the invention.

DESCRIPTION OF PREFERRED EMBODIMENTS

According to one preferred embodiment, a urinal and pipe cleaning composition comprises urea hydrochloride and one or more thickeners. The urea hydrochloride may be a pre-formulated chemical compound or the composition may comprise a mixture of urea and hydrochloric acid, preferably equimolar quantities, in water. Most preferably, the thickener or viscosity modifier comprises xanthan gum, agar, gelatin, alginate, pectin, or synthetic polymers, or a combination thereof. Most preferably, the composition further comprises one or more hard surface cleaners or surfactants, such as cocamidopropyl betaine (CAPB) and ethoxylated alcohol surfactants. The composition also preferably comprises one or more fragrances, such as a fresh scent, citrus scent, or pine scent. Water and oil-based fragrances may be used.

One or more hard surface cleaners or surfactants, such as CAPB and/or ethoxylated alcohol surfactants, are also preferably used with urinal and pipe cleaning compositions according to the invention. Other surfactants such as amine oxides (for example, coco alkyldimethyl N-oxides or lauramine oxide) and/or quaternary ammonium compounds (for example, di-C8-10-alkyldimethyl, chlorides) may be used as well. CAPB is an amphoteric surfactant meaning that it has zwitterionic characteristics (i.e. both positive and negatively charged structures on the same molecule). Ethoxylated alcohols are non-ionic surfactants which are synthesized by reacting fatty alcohols with ethylene oxide. They consist of both a hydrophobic fatty alcohol chain and a hydrophilic polyoxyethylene chain. Ethoxylated alcohols can vary in structure (linear or branched) and length, depending on the components used in synthesis. Although other ethoxylated alcohols may be used, it is preferred to use linear C9-11 ethoxylated alcohols due to their emulsification and foaming properties. These linear C9-11ethoxylated alcohols may include trade names such as Genapol® UD-079 (a C11-oxo alcohol polyglycol ether), Tomodol® 91-6, or T-DetA® 91-6, as well as others. CAPB is often used to enhance the cleaning effect of nonionic surfactants like ethoxylated alcohols, therefore according to another preferred embodiment, a urinal and pipe cleaning composition comprises both CAPB and one or more ethoxylated alcohols in the concentrations indicated below. According to another preferred embodiment, a urinal and pipe cleaning composition comprises CAPB or one or more ethoxylated alcohols, but not both.

A urinal and pipe cleaning composition also preferably comprises one or more thickeners (or viscosity modifiers). Preferred thickeners include xanthan gum, agar, gelatin, alginate, pectin, or synthetic polymers. Most preferably, the thickener is xanthan gum (such as KELTROL® CG by CPKelko).

According to another preferred embodiment, a urinal and pipe cleaning composition is a concentrated, aqueous formulation. A concentrated composition preferably comprises 0.1-10% urea hydrochloride, more preferably 0.2-2% urea hydrochloride, and most preferably 0.3-0.5% urea hydrochloride by weight. When CAPB is used, a concentrated composition preferably comprises 0.1-5%, more preferably 1-4%, most preferably 2-3% of CAPB by weight. When one or more ethoxylated alcohols is used, a concentrated composition preferably comprises 1-10%, more preferably 3-7%, and most preferably 4-6% total of the one or more ethoxylated alcohols by weight. It is preferable to use linear C9-11 ethoxylated alcohols, such as Tomodol® 91-6 or Genapol® UD-079. These ethoxylated alcohols have a shorter alkyl chain. Because of this, they are more reactive and are able to penetrate a stain/soiled surface more readily. They are also biodegradable, making them ideal for cleaning water-washed surfaces. A concentrated composition preferably comprises one or more thickeners in a total amount sufficient to increase the viscosity of the composition (as compared to a composition with the same ingredients but excluding the thickener) by 20 to 60 times, more preferably 30 to 50 times, and most preferably 35 to 45 times. According to one preferred embodiment, a concentrated composition preferably comprises one or more thickeners in a total amount of 0.1% to 1%, more preferably 0.2% to 0.8%, and most preferably 0.3% to 0.5% by weight of the composition. When an optional fragrance is used, a concentrated composition preferably comprises 0.05-5%, more preferably 0.1-2%, and most preferably 0.5-1% total of the one or more fragrances by weight. Most preferably, a concentrated composition preferably comprises around 83-99% water, more preferably around 87-96% water, and most preferably around 89-93% water. Most preferably, concentrated compositions according to other preferred embodiments comprise any individual amount of these ingredients within these ranges or any subset of these ranges, including any subset that overlaps one preferred range to another preferred range. Most preferably, a concentrated composition does not comprise more than 99% water, more preferably no more than 96% water, and most preferably no more than 93% water.

According to another preferred embodiment, a water-based urinal and pipe cleaning composition in concentrated form comprises around 5% ethoxylated alcohols, around 2% CAPB, around 0.7% of a fragrance (such as "ocean fresh" scent), around 0.35% of Xanthan gum, around 0.4% of urea hydrochloride, and around 91.55% water.

These amounts in preferred embodiments provide a viscosity for the concentrated composition of around 200 to 600 centipoise, more preferably 300-500 centipoise, and most preferably 350-450 centipoise at a temperature of 68 to 72° F. Most preferably, concentrated compositions according to other preferred embodiments have a viscosity that is any individual value within these ranges or any subset of these ranges, including any subset that overlaps one preferred range to another preferred range. These viscosity ranges have the benefit of being thick enough without being too thick to both work well with an automated dispensing system and method according to preferred embodiments of the invention to allow the composition to be sprayed or streamed onto a surface to be cleaned and allow the composition to be thick enough to coat the surfaces to be cleaned, allowing for longer contact time with the surface without the composition running down the urinal and drain too quickly. The preferred amounts of the ingredients, particularly the thickener, may be altered based on the other specific ingredients used to achieve a viscosity for the concentrated composition within the preferred ranges herein. Additionally, the amount of thickener used may be altered to achieve other desired viscosities, as will be understood by those of ordinary skill in the art, depending on the method of dispensing the cleaner, the specific point-of-use application, the requirements for the specific automated dispenser being used, and/or the specific other ingredients used.

Preferably, the composition has a pH of 0.75 to 2.5, more preferably between 0.9 to 1.8, and most preferably between 0.95 to 2.1.

According to one preferred embodiment, as shown in FIG. 1, an automatic dispensing system 10 comprises a container 14 for holding an initial volume of a cleaning composition, preferably one according to an embodiment of the invention, a dispensing tube 16 in fluid communication with the container 14 at a first end and having a second end disposed near the point-of-use (the urinal surface, a drain opening, or in fluid communication with a piping system connected to one or more urinals). Container 14 is configured to be easily removable from dispensing system 10 and replaced with a new container 14 with the initial volume of cleaning composition in container 14 is depleted or near depletion. The automated dispenser also preferably comprises a valve 18 configured to control release of the composition from the container 14 to the dispensing tube 16. The automated dispenser 10 also preferably comprises a controller 22 or a timer to control activation of the dispensing valve 18, to open and close the valve 18 for a predetermined duration to allow a metered amount (a dose or dosage) of the composition to be dispensed from the container through the dispensing tube 16 to the point-of-use. The automated dispenser system 10 may be configured to open valve 18 at predetermined time intervals. Most preferably, valve 18 is opened at least once per 10 to 20 uses (or flushes), more preferably at least once per 5 to 9 uses, and most preferably at least once per each use.

The automated dispenser system 10 may also be configured to open valve 18 in response to motion or movement at or near the urinal, in response to flushing the urinal, or a combination thereof. The automated dispenser 10 may comprise one or more sensors 24, such as a motion or vibration or sound sensor, to determine when a user is at the urinal or when the urinal has been flushed. Controller 22 is preferably configured to send signals to valve 18 and to receive signals or data from sensors 24. When in response to motion near the urinal or flushing the urinal, there is preferably a time delay between when motion is first sensed or flushing is first sensed prior to dispensing to allow the user to finish using the urinal and the flushing to be complete. Preferably, this time delay is 10 to 120 seconds, more preferably 13 to 90 seconds, and most preferably 15 to 60 seconds, but any individual duration or subset of these ranges may also be used. Dispensing is preferably by gravity flow, but a small pump may also be used. To allow gravity flow, the container 14 is preferably disposed at a higher elevation than the second end of the tube or nozzle 20. Additionally, a nozzle 20 may be included at the second end of the dispensing tube to spray or stream the composition toward a desired location or in a desired pattern. For example, when dispensed at an upper end of a urinal, a semi-circular or 180° spray pattern may be used to spray all or substantially all of the width of the urinal. When dispensed directly into a drain or pipe, a 360° spray pattern may be used. Automated dispenser 10 also preferably comprises an outer housing 12, with an openable or removable cover (not shown in FIG. 1). Outer housing 12 is preferably mounted on a wall or other surface near a urinal or pipe to be treated or may be mounted to an upper surface of the urinal. Dispensing tube 16 may be longer than shown in FIG. 1 to reach a point closer to the desired point-of-use/dispensing and its second end may be open to allow the composition to simply stream from the end or it may include a nozzle 20 to provide a spray pattern or to direct spray of the composition.

Most preferably, the automated dispenser system 10 is configured to dispense a predetermined dosage of the urinal and pipe cleaning composition at predetermined time intervals by spraying or streaming the composition into a urinal or a pipe system. Most preferably the daily dosage is around 1-50 mL, more preferably 5-20 mL, and most preferably 7-13 mL and the time intervals for dosing are at least once every day, more preferably several times per day, and most preferably once per hour.

Controller 22 may also be configured to determine when container 14 needs to be replaced with a new container 14 and to send an alert or signal to notify personnel that a replacement is needed. Controller 22 may be configured to track a cumulative volume of cleaning composition dosed from any particular container 14 and to calculate a remaining volume of cleaning composition in container 14 based on the initial volume in container 14 and the amount dispensed. Most preferably, the cumulative volume dispensed is for each individual container 14 and is reset to zero when a new container 14 is inserted into system 10, either automatically or by manual activation of a reset when container 14 is replaced. Controller 22 may also be configured to track the number of flushes of a urinal or a weight of container 14 to determine when the amount of cleaning composition in container 14 is low or empty. Most preferably, controller 22 sends an alert or signal when a volume of cleaning composition in container 14 is below a predetermined threshold, such as 10% or 5% volume remaining, to indicate the container is near empty (or actually empty, if desired) so that it may be replaced. An alert or signal may be a light on system 10 (such as a flashing light on outer housing 12 that is easily visible to maintenance personnel), an audible alarm (preferably one that sounds at periodic intervals), or an electronically sent message (such as a text message or email) to notify maintenance personnel that container 14 needs to be replaced.

A controller 22 for an automated dispensing system 10 may also be configured to control actuation of a flush valve for the urinal to allow automatic flushing at predetermined time intervals after dispensing one or more doses of cleaning composition. An automated dispensing system 10 may include a lever to depress a flush valve handle on the urinal in response to signals from the controller. A controller 22 for an automated dispensing system 10 may also be configured to detect when a user is near a urinal, such as by including a motion detector 24, and/or to detect when the urinal is manually flushed or flushed by an automated flusher that is separate from an automated dispensing system by including a vibration or sound sensor 24. When motion or flushing is sensed, the controller 22 preferably delays dispensing of a cleaning solution for a predetermined period of time, such as 30 second to 120 seconds, to allow the user to finish using the urinal and flushing to be complete to avoid having the dispensed cleaner flushed down the urinal before it has sufficient contact time with the surface of the urinal.

Urea hydrochloride is not compatible with reactive metals such as aluminum, tin, and zinc; therefore, these materials are preferably not used in components of the automated dispensing unit 10 or at least not used for the components that will contact the cleaning composition, such as container 14, dispensing tube 16, valve 18 (depending on the type of valve use), and nozzle 20.

According to one preferred embodiment of the invention, a method for automatically dispensing a metered dose of urinal and pipe cleaning composition comprises periodically dispensing, at predetermined time intervals, in response to movement near the urinal, in response to flushing the urinal, or a combination thereof, a dosage of cleaning composition onto a urinal surface, into a drain, or into a piping system connected to one or more urinals. According to one preferred embodiment, the total daily dosage is around 10 mL/day. According to other preferred embodiments, the total daily dosage is around 1-50 mL, more preferably 5-20 mL, and most preferably 7-13 mL. Any individual dosing amount or subset of these ranges may also be used. The amount of individual doses will vary depending on how frequently the urinal is used. High frequency would need a little less after each flush compared to low frequency to achieve a daily total dose in these preferred ranges. A high frequency urinal (20+ flushes daily) would preferably use a lower individual dose, such as 0.25-0.5 mL after each flush. A low frequency urinal (1-10 flushes daily) would preferably use a higher individual dose, such as 1-10 mL dose after each flush. Preferred predetermined time intervals for dosing are preferably at least once every day, more preferably several times per day, and most preferably once per hour. Dosing may also be automatically carried out in response to movement near the urinal and/or in response to the urinal being flushed. Most preferably, there is a time delay with respect to movement or flushing before a dose of composition is dispensed, so that the dispensing is preferably just after the urinal has been used and flushed. This gives the composition sufficient contact time with the urinal and/or drain, as further discussed below, prior to being diluted and flushed into the pipe. Preferably, this time delay is 10 to 120 seconds, more preferably 13 to 90 seconds, and most preferably 15 to 60 seconds, but any individual duration or subset of these ranges may also be used. Most preferably, a urinal and pipe cleaning composition according to preferred embodiments of the invention, preferably in concentrated form, is used with the methods of the invention. According to one preferred method, each dose of concentrated composition is dispensed onto an upper wall surface of a urinal or into a main pipe (vacuum break) of the urinal, or a combination thereof. The concentrated formula preferably coats the surface of the urinal and/or pipe walls to treat and prevent uric acid salt build-up.

A method of automatically dispensing preferably further comprises diluting the cleaning composition by flushing the urinal. Most preferably, the flushing is automatically carried out by a controller connected to a valve for the flush water to the urinal, but flushing may also be performed manually. Preferably, a concentrated urinal and pipe cleaning composition is allowed to contact the surfaces to be cleaned, including slowly running down the sides of the urinal, drain, or other pipe surfaces to which it has been dispensed by gravity, for a period of contact time prior to being diluted with water by flushing the urinal. Most preferably, the period of contact time is 1 to 60 minutes, more preferably 1 to 30 minutes, and most preferably 1 to 15 minutes. Any individual duration or subset of these time ranges may also be used. This allows the composition sufficient contact time for cleaning and to dissolve salts that have accumulated on the surface. It is most preferred that the urinal be flushed at least one time every day to move the cleaner through the pipe. Dilution by flushing reduces the need for human handling by hand-mixing a dilution. Once diluted by flushing, the cleaning composition flows down the remaining surfaces of the urinal, drain, and piping to provide additional cleaning and freshening.

According to another preferred embodiment, a method of cleaning a urinal or a urinal pipe comprises: (1) dispensing a first dose of a cleaning composition onto a surface of the urinal surface or into the urinal pipe and (2) repeating the first dose dispensing step after a first event, wherein the first event is (a) a first time interval from one of a previous first dose dispensing steps; (b) motion detected at or near the urinal; (c) flushing of the urinal; (d) or a combination thereof. According to another preferred embodiment, a method of cleaning further comprises: (3) dispensing a second dose of the cleaning composition onto the urinal surface or into the pipe and (4) repeating the second dose dispensing step after a second event, wherein the second event is different from the first event and comprises: (a) a second time interval from one of a previous second dose dispensing steps or one of the previous first dose dispensing steps, (b) motion detected at or near the urinal, (c) flushing of the urinal, or (d) a combination thereof. According to another preferred embodiment, a method of cleaning further comprises: (5) flushing the urinal after a predetermined contact time, preferably around 1 to 60 minutes, for the cleaning composition to contact the surface of the urinal or the urinal pipe after at least one of the first dose dispensing steps, or after at least one of the second dose dispensing steps, or both.

Most preferably, cleaning compositions according to preferred embodiments of the invention are used in the methods according to preferred embodiments of the invention. Most preferably, each first dose is around 0.25 to 10 mL and each second dose is around 1 to 10 mL, but dose amounts according to other embodiments herein may also be used. Most preferably each second dose is larger than the first dose. Most preferably, the first time interval or second time interval is around 60 minutes to 24 hours, but time intervals according to other embodiments herein may also be used.

According to other preferred embodiments for an automated dispensing system and method, various dosing regimens may be used. One preferred dosing regimen is to periodically dispense a small dose multiple times a day, as previously discussed. Another preferred dosing regimen is to do a larger, single dosage at longer time intervals. Such larger dosage may be around 5-50 mL, more preferably 2-25 mL, and most preferably 5-15 mL and dispensed once per day, a few times per week, once per week, etc., depending on the level of salt build-up, staining, and usage the urinal has. Most preferably, a combination of small doses (such as 0.5 mL every hour) and large doses (such as 10 mL every day) are used to provide more effective treatment. Most preferably, an automated dosing system according to the invention may be preprogrammed or programmable with different dosing amounts and dosing schedules, and to preferably allow the schedules and amounts to be modified by a user, to accommodate the needs to the facility in which the urinal or urinal system is located.

All numerical or ratio value ranges, such as ranges or ratios for amounts for ingredients, temperatures, viscosities, dosage amounts, or other properties indicated herein include each individual numerical value or ratio within those ranges and any and all subset combinations within those ranges, including subsets that overlap from one preferred range to a more preferred range. Those of ordinary skill in the art will appreciate upon reading this specification, including the examples contained herein, that modifications and alterations to the composition, system, and methodology for making and using the composition may be made within the scope of the invention and it is intended that the scope of the invention disclosed herein be limited only by the broadest interpretation of the appended claims to which the inventor is legally entitled.

We claim:

1. A method for cleaning a urinal surface or a urinal pipe of a urinal, the method comprising:

dispensing a first dose of a cleaning composition onto the urinal surface or into the urinal pipe; and repeating the dispensing the first dose step after a first event;

wherein the cleaning composition comprises urea hydrochloride and one or more thickeners and wherein the cleaning composition has a viscosity of 200 to 600 centipoise when the cleaning composition is at a temperature of 65° F. to 72° F.; and wherein the first event is (1) a first time interval from one of a previous first dose dispensing steps; (2) motion detected at or near the urinal; (3) flushing of the urinal; (4) or a combination thereof.

2. The method of claim 1 wherein each first dose is around 0.25 to 10 mL and the first time interval is around 60 minutes to 24 hours.

3. The method of claim 1 wherein the cleaning composition further comprises 4% to 11% total of one or more surfactants;

wherein the cleaning composition comprises 0.2% to 2% of the urea hydrochloride, wherein the percentages are by weight, and wherein the dispensing the first dose step comprises spraying or streaming the first dose onto an upper portion of the urinal surface to allow the first dose to run down at least a portion of the urinal surface by gravity.

4. The method of claim 3 wherein the one or more surfactants comprise 1% to 4% cocamidopropyl betaine and 3% to 7% total of one or more ethoxylated alcohols.

5. The method of claim 4 wherein the one or more thickeners comprise, xanthan gum, agar, gelatin, alginate, pectin, or synthetic polymers or a combination thereof.

6. The method of claim 5 wherein the composition comprises 0.1 to 10% urea hydrochloride, 0.1 to 1% total of the one or more thickeners, and 1 to 15% total of the one or more surfactants by weight of the composition.

7. The method of claim 6 further comprising dispensing a second dose of the cleaning composition onto the urinal surface or into the pipe; and repeating the dispensing the second dose step after a second event; and wherein the second event is different from the first event and comprises: (1) a second time interval from one of a previous second dose dispensing steps or one of the previous first dose dispensing steps; (2) motion detected at or near the urinal; (3) flushing of the urinal, or (4) a combination thereof.

8. The method of claim 7 wherein the second dose is around 1 to 10 mL and is larger than the first dose.

9. The method of claim 1 further comprising flushing the urinal after a predetermined contact time for the cleaning composition to contact the urinal surface or the urinal pipe after at least one of the first dose dispensing steps.

10. The method of claim 9 wherein the predetermined contact time is 1 to 60 minutes.

11. The method of claim 1 wherein a total amount of the one or more thickeners results in the viscosity of the cleaning composition being 20 to 60 times higher than a viscosity of a composition that is the same as the cleaning composition except that the composition does not comprise the one or more thickeners.

12. The method of claim 11 wherein the total amount of the one or more thickeners results in the viscosity of the cleaning composition being 30 to 50 times higher than the viscosity of the composition that is the same as the cleaning composition except that the composition does not comprise the one or more thickeners.

13. The method of claim 11 wherein the total amount of the one or more thickeners results in the viscosity of the cleaning composition being 35 to 45 times higher than the viscosity of the composition that is the same as the cleaning composition except that the composition does not comprise the one or more thickeners.

14. The method of claim 1 wherein the cleaning composition comprises 0.1% to 10% of the urea hydrochloride and 0.1% to 1% total of the one or more thickeners; and wherein the cleaning composition further comprises 0.1% to 5% cocamidopropyl betaine and 1% to 10% total of one or more ethoxylated alcohols.

15. The method of claim 1 wherein the cleaning composition comprises 0.2% to 2% of the urea hydrochloride and 0.2% to 0.8% total of the one or more thickeners; and wherein the cleaning composition further comprises 1% to 4% cocamidopropyl betaine and 3% to 7% total of one or more ethoxylated alcohols.

16. The method of claim 1 wherein the cleaning composition comprises 0.3% to 0.5% of the urea hydrochloride and 0.3% to 0.5% total of the one or more thickeners; and wherein the cleaning composition further comprises 2% to 3% cocamidopropyl betaine and 4% to 6% total of one or more ethoxylated alcohols.

17. The method of claim 16 wherein the cleaning composition consists essentially of the urea hydrochloride, the one or more thickeners, the cocamidopropyl betaine, the one or more ethoxylated alcohols, and water.

18. The method of claim 17 wherein the one or more thickeners comprises xanthan gum.

19. The method of claim 16 wherein the one or more thickeners comprises xanthan gum.

20. The method of claim 11 wherein the cleaning composition comprises 0.2% to 2% of the urea hydrochloride and 0.2% to 0.8% total of the one or more thickeners; and wherein the cleaning composition further comprises 1% to 4% cocamidopropyl betaine and 3% to 7% total of one or more ethoxylated alcohols.

21. The method of claim 1 further comprising:

placing an automatic dispenser near or on the urinal surface, wherein the automatic dispenser comprises:

a container for holding an initial volume of the cleaning composition;

a dispensing tube;

a valve configured to allow the first dose of the cleaning composition to flow from the container through the dispensing tube to the urinal surface or into the urinal pipe;

a first sensor configured to detect the first event and send a first signal; and a controller configured to receive the first signal and actuate the valve in response to the first signal; and wherein repeating the dispensing the first dose step is automatically carried out by the automatic dispenser.

22. The method of claim 21 wherein the first sensor is a motion detector and the first event is the motion detected at or near the urinal.

23. The method of claim 21 wherein the first sensor is a vibration detector or a sound detector and the first event is the flushing of the urinal.

24. The method of claim 21 wherein the first sensor is a timer and the first event is the first time interval.

25. The method of claim 21 further comprising dispensing a second dose of the cleaning composition onto the urinal surface or into the pipe; and automatically repeating the dispensing the second dose step with the automatic dispenser after a second event; and wherein the second event is different from the first event and comprises: (1) a second time interval from one of a previous second dose dispensing steps or one of the previous first dose dispensing steps; (2) motion detected at or near the urinal; (3) flushing of the urinal, or (4) a combination thereof;

wherein the automatic dispenser further comprises a second sensor configured to detect the second event and send a second signal; and wherein the controller configured to receive the second signal and actuate the valve in response to the second signal.

26. The method of claim 25 wherein one of the first sensor or the second sensor is a motion detector and a corresponding one of the first event or the second event is the motion detected at or near the urinal; and wherein the other of the first sensor or the second sensor is a vibration detector or a sound detector and a corresponding other of the first event or the second event is the flushing of the urinal.

27. The method of claim 25 wherein one of the first sensor or the second sensor is a motion detector and a corresponding one of the first event or the second event is the motion detected at or near the urinal; and wherein the other of the first sensor or the second sensor is a timer and a corresponding other of the first event or the second event is the first time interval or the second time interval.

28. The method of claim 25 wherein one of the first sensor or the second sensor is a vibration detector or a sound detector and a corresponding one of the first event or the second event is the flushing of the urinal; and wherein the other of the first sensor or the second sensor is a timer and a corresponding other of the first event or the second event is the first time interval or the second time interval.

29. The method of claim 21 wherein the first sensor is a vibration detector or a sound detector and the first event is the flushing of the urinal.

30. The method of claim 25 wherein the cleaning composition comprises 0.2% to 2% of the urea hydrochloride and 0.2% to 0.8% total of the one or more thickeners; and wherein the cleaning composition further comprises 1% to 4% cocamidopropyl betaine and 3% to 7% total of one or more ethoxylated alcohols.

31. The method of claim 30 wherein a total amount of the one or more thickeners results in the viscosity of the cleaning composition being 20 to 60 times higher than a viscosity of a composition that is the same as the cleaning composition except that the composition does not comprise the one or more thickeners.

32. The method of claim 31 wherein the viscosity of the cleaning composition 300 to 500 centipoise when the cleaning composition is at a temperature of 68° F. to 72° F.

33. The method of claim 31 wherein the viscosity of the cleaning composition 350 to 450 centipoise when the cleaning composition is at a temperature of 68° F. to 72° F.

34. The method of claim 31 wherein the first dose is at least around 0.25 mL and less than 10 mL; and the second dose is around 1 mL to 10 mL and is larger than the first dose.

35. The method of claim 34 wherein a total of each of the first dose and the second dose in a day is around 1-50 mL.

36. The method of claim 34 wherein a total of each of the first dose and the second dose in a day is around 5-20 mL.

37. The method of claim 34 wherein a total of each of the first dose and the second dose in a day is around 7-13 mL.

38. The method of claim 34 wherein a distal end of the dispensing tube is disposed near an upper wall portion of the urinal surface;

wherein the dispensing the first dose step comprises spraying or streaming the first dose onto the upper wall portion of the urinal surface to allow the first dose to run down at least a first portion of the urinal surface by gravity; and wherein the dispensing the second dose step comprises spraying or streaming the second dose onto the upper wall portion of the urinal surface to allow the second dose to run down the first portion or at least a second portion of the urinal surface by gravity.

39. The method of claim 34 wherein the dispensing tube is configured to dispense the first dose and the second dose into the urinal pipe and wherein the urinal pipe comprises a drainpipe.

40. The method of claim 25 wherein the first event is not the flushing of the urinal.

41. The method of claim 40 wherein the second event is not the flushing of the urinal.

42. The method of claim 25 wherein the second event is not the flushing of the urinal.

43. The method of claim 1 wherein the first event is not the flushing of the urinal.

44. The method of claim 7 wherein the first event is not the flushing of the urinal.

45. The method of claim 44 wherein the second event is not the flushing of the urinal.

46. The method of claim 1 wherein the urinal is a waterless urinal.

47. The method of claim 25 wherein the controller is further configured to automatically flush the urinal after period of contact time following the first dose or the second dose being dispensed.

* * * * *